United States Patent
Leonard et al.

(10) Patent No.: US 7,119,829 B2
(45) Date of Patent: *Oct. 10, 2006

(54) VIRTUAL CONFERENCE ROOM

(75) Inventors: Edwin R. Leonard, San Dimas, CA (US); Bruce Daitch, Los Angeles, CA (US); Emmanuel C. Francisco, Northridge, CA (US); Richard F. Rubio, Altadena, CA (US); Derek Chan, Stevenson Ranch, CA (US); James F. Beshears, San Marino, CA (US)

(73) Assignee: DreamWorks Animation LLC, Glendale, CA (US)

( * ) Notice: Subject to any disclaimer, the term of this patent is extended or adjusted under 35 U.S.C. 154(b) by 124 days.

This patent is subject to a terminal disclaimer.

(21) Appl. No.: 10/633,266

(22) Filed: Jul. 31, 2003

(65) Prior Publication Data

US 2005/0024484 A1    Feb. 3, 2005

(51) Int. Cl.
*H04N 7/14* (2006.01)
(52) U.S. Cl. ................. 348/14.16; 348/14.08
(58) Field of Classification Search .. 348/14.01–14.09, 348/14.1, 14.11–14.13, 14.16; 370/260, 370/261; 709/204; 345/753
See application file for complete search history.

(56) References Cited

U.S. PATENT DOCUMENTS

| 2,420,198 | A |   | 5/1947  | Rosenthal |             |
|-----------|---|---|---------|-----------|-------------|
| 4,400,724 | A |   | 8/1983  | Fields    |             |
| 4,890,314 | A |   | 12/1989 | Judd et al. |           |
| 4,928,301 | A |   | 5/1990  | Smoot     |             |
| 5,038,224 | A |   | 8/1991  | Martulli et al. |       |
| 5,117,285 | A |   | 5/1992  | Nelson et al. |         |
| 5,187,571 | A |   | 2/1993  | Braun et al. |          |
| 5,335,022 | A |   | 8/1994  | Braun et al. |          |
| 5,400,069 | A |   | 3/1995  | Braun et al. |          |
| 5,467,152 | A | * | 11/1995 | Wilson et al. | ....... 353/99 |
| 5,572,248 | A |   | 11/1996 | Allen et al. |          |
| 5,612,733 | A |   | 3/1997  | Flohr     |             |
| 5,751,337 | A | * | 5/1998  | Allen et al. | ..... 348/14.07 |
| 5,883,606 | A |   | 3/1999  | Smoot     |             |
| 5,953,053 | A | * | 9/1999  | Chen et al. | ..... 348/14.16 |

(Continued)

FOREIGN PATENT DOCUMENTS

DE    3442388 C   *   3/1986

(Continued)

OTHER PUBLICATIONS

Computer Graphics and Applications, Jul./Aug. 2000, pp. 76-78.

(Continued)

*Primary Examiner*—Melur Ramakrishnaiah
(74) *Attorney, Agent, or Firm*—Morrison & Foerster LLP

(57) ABSTRACT

An enhanced video conferencing system and method includes at least two conference rooms, the conference rooms connected together electronically to permit the transmission of images and sound from one room to the other room. Each room has a large format display system for projecting images and a camera positioned with respect to the large format display system to capture images of the conference room and its participants while the participants are looking at the large format display system, without obscuring the participants' view of the display system, so as to provide the perception that the participants in one conference room are looking directly at the participants in the other conference room. The enhanced video conferencing system may also include an additional camera for capturing an image of an item located at a pre-determined location within the conference room for ultimate transmission to the other conference room for viewing.

32 Claims, 11 Drawing Sheets

U.S. PATENT DOCUMENTS

| | | | | |
|---|---|---|---|---|
| 5,988,829 | A | * | 11/1999 | Holder .................... 362/217 |
| 6,062,704 | A | * | 5/2000 | Holder .................... 362/223 |
| 6,561,678 | B1 | * | 5/2003 | Loughrey ................ 362/282 |
| 6,677,979 | B1 | * | 1/2004 | Westfield ............. 348/14.12 |
| 6,848,994 | B1 | * | 2/2005 | Knust et al. ............... 463/25 |
| 2002/0063780 | A1 | | 5/2002 | Harman et al. |
| 2003/0058334 | A1 | | 3/2003 | Boyden et al. |
| 2003/0058363 | A1 | | 3/2003 | Boyden et al. |
| 2003/0112325 | A1 | | 6/2003 | Boyden et al. |

FOREIGN PATENT DOCUMENTS

| | | | | |
|---|---|---|---|---|
| JP | 357061389 | A | * | 4/1982 |
| JP | 401032290 | A | * | 2/1989 |
| JP | 401049490 | A | * | 2/1989 |
| JP | 401206765 | A | * | 8/1989 |
| JP | 408214271 | A | * | 8/1996 |
| JP | 409205626 | A | * | 8/1997 |
| JP | 02000003139 | A | * | 1/2000 |
| JP | 0200033067 | A | * | 11/2000 |
| JP | 02001309366 | A | * | 11/2001 |

OTHER PUBLICATIONS

Chen, Milton, *Design of a Virtual Auditorium*, Proceedings of ACM Multimedia, Minneapolis, 2001, pp. 19-28.

Chen, Milton, *Leveraging the Asymmetric Sensitivity of Eye Contact for Videoconference*, Proceedings of CHI, vol. No. 4, Issue No. 1, Apr. 20-25, 2002, pp. 49-56.

Heath, Christian et al., *Disembodied Conduct: Interactional Asymmetries in Video-Mediated Communication*, Published in: Technology in Working Order: Studies of Work, Interaction, and Technology, Graham Button, editor, London 1993, pp. 35-54.

Heim, Jan et al., *Videotelephony Fitness-for-Purpose Requirements*, ACTS Project AC314 Vis-à-vis: Fitness-for-Purpose of Videotelephony in Face-to-Face Situations, CEC Deliverable A314/UoN/SoP/DS/R/001/b1, May 1998, pp. 1-48.

Kelshikar, Nikhil, *Real-Time Terascale Implementation of Tele-immersion*, International Conference on Computational Science (ICCS), Jun. 2003, 10 pages.

Kuzuoka, Hideaki et al., *Agora: A Remote Collaboration System that Enables Mutual Monitoring*, in CHI'99 Extended Abstracts, 1999, 2 pages.

Low, Kok-Lim, *Life-Sized Projector-Based Dioramas*, Proceedings of ACM Symposium on Virtual Reality Software and Technology 2001 (VRST 2001), Nov. 2001, 9 pages.

Majumder, Aditi et al., *Immersive Teleconferencing: A New Algorithm to Generate Seamless Panoramic Video Imagery*, Proc ACM Multimedia'99, 1999, 8 pages.

Maojun, Zhang et al., *VCS: A Virtual Environment Support for Awareness and Collaboration*, ACM Multimedia, Oct. 1999, pp. 163-165.

Mark, Gloria et al., An Experiment Using Life-size HDTV, WACE 2001 Proceedings, pp. 1-6.

Mark, Gloria, *Extreme Collaboration*, Communications of the ACM, Dec. 2001, pp. 1-8.

Mark, Gloria et al., *Group-to-Group Distance Collaboration: Examining the "Space Between,"* Proceedings of the 8th European Conference of Computer-supported Cooperative Work, Sep. 14-18, 2003, Finland, pp. 1-20.

Morikawa, Osamu et al., *HyperMirror: Toward Pleasant-to-use Video Mediated Communication System*, Proceedings of the 1998 ACM conference on Computer supported cooperative work, 1998, pp. 149-158.

Nielsen, Jakob, *CHI92 Trip Report*, Monterey, CS, May 3-7, 1992, [Retrieved on Nov. 12, 2003]. Retrieved from the Internet: URL<http//www.useit.com/papers/tripreports/chi92.html> pp. 1-5.

Okada, Ken-ichi et al., *Multiparty Videoconferencing at Virtual Social Distance: MAJIC Design*, Proceedings of CSCW 1994, ACM, Chapel Hill, NC, pp. 385-393.

Raskar, Ramesh, *Immersive Planar Display Using Roughly Aligned Projectors*, IEEE VR, Mar. 2000, 7 pages.

Raskar, Ramesh et al., *Multi-Projector Displays Using Camera-Based Registration*, IEEE Visualization, San Francisco, Oct. 1999, 8 pages.

Sadagic, Amela et al., *Tele-immersion Portal: Towards an Ultimate Synthesis of Computer Graphics and Computer Vision*, The 4th Annual International Workshop on Presence, May 21-23, 2001, 8 pages.

Towles, Herman, *Transport and Rendering Challenges of Multi-Stream 3D Tele-Immersion Data*, NSF Lake Tahoe Workshop on Colloborative Virtual Reality and Visualization (CVRV 2003), Tahoe City (Oct. 26-28, 2003), pp. 1-6.

Towles, Herman et al., *3D Tele-Collaboration Over Internet2*, In Proceedings of the International Workshop on Immersive Telepresence (ITP 2002), Juan-les-Pins, France, Dec. 2004, 4 pages.

Vertegaal, Roel et al., *Effects of Gaze on Multiparty Mediated Communication*, Proceedings of Graphics Interface, Montreal, Canada, 2000, 8 pages.

Vertegaal, Roel, *The GAZE Groupware System: Mediating Joint Attention in Multiparty Communication and Collaboration*, Proceedings of ACM CHI'99 Conference on Human Factors in Computing Systems, Pittsburgh, PA, ACM, 1999, 8 pages.

Welch, Greg et al., *Projected Imagery in Your "Office of the Future,"* IEEE Computer Graphics and Applications, Jul./Aug. 2000, pp. 62-67.

Wellner, Pierre D., *Adaptive Thresholding for the DigitalDesk*, Technical Report EPC-1993-110, © Rank Xerox Ltd, Cambridge, 1993.

Wellner, Pierre, *Interacting With Paper on the DigitalDesk*, Communications of the ACM, Jul. 1993, pp. 1-17.

Wellner, Pierre et al., *The Double Digital Desk: Shared Editing of Paper Documents*, Technical Report EPC-93-108, © Xerox Research Centre, Cambridge, 1993, 6 pages.

Yang, Ruigang et al., *Creating Adaptive Views for Group Video Teleconferencing—An Image-Based Approach*, International Workshop on Immersive Telepresence (ITP2002), France, Dec. 2002, 4 pages.

Polycom Video Communications, Collaboration Solutions, *Video Streaming With Polycom iPower™ Video Collaboration Solutions*, © 2002, pp. 1-5.

Polycom Video Communications, Collaboration Solutions, *Visual Collaboration Using Polycom iPower Video Conferencing Systems*, © 2002, 6 pages.

Teliris Ltd, *Facing Realty, GlobalTable™ Replaces In-Person Meetings*, © 2001, pp. 1-9.

Teliris, *Preserving the Geometry of Sound*, [Retrieved on Nov. 11, 2003]. Retrieved from the Internet: URL: http://www.teliris.com/technology_audio_presentation.html, pp. 1-2.

Teliris, *Creating a Constructive Space*, [Retrieved on Nov. 11, 2003]. Retrieved from the Internet: URL: http://www.teliris.com/technology_environment_design.html, pp. 1-2.

Teliris, *Creating a Uniform Virtual Geometry*, [Retrieved on Nov. 11, 2003]. Retrieved from the Internet: http://www.teliris.com/technology_virtual_vectoring.html, pp. 1-2.

Barakonyi, István et al., *Augmented Reality Videoconferencing for Collaborative Work*, Proc. of the 2nd Hungarian Conference on Computer Graphics and Geometry, Budapest, Hungary, May 2003, 8 pages.

Bishop, Gary et al., *Working in the Office of "Real Soon Now,"* IEEE.

Maojun, Zhang et al., "VCS: A Virtual Environment Support for Awareness and Collaboration," ACM 1-58113-239-5/99/0019 . . . , 1999, pp. 163-165.

Raskar, Ramesh et al., "Multi-Projector Displays Using Camera-Based Registration," IEEE Visualization, San Francisco, CA, US, Oct. 1999.

Raskar, Ramesh et al., "The Office of the Future: A Unified Approach to Image-Based Modeling and Spatially Immersive Displays," SIGGRAPH 98, Orlando, Florida, Jul. 19-24, 1998 (Computer Graphics Proceedings, Annual Conference Series, 1998), pp. 1-10.

Raskar, Ramesh, "Immersive Planar Display Using Roughly Aligned Projectors," Proceedings of the IEEE Virtual Reality 2000 Conference.

Tang, John et al., "Supporting Distributed Groups With a Montage of Lightweight Interactions," Proceedings of the ACM Conference on Computer Supported Cooperative Work, Chapel Hill, Oct. 22-26, 1994, pp. 23-24.

Toweles, Herman et al., "Transport and Rendering Challenges of Multi-Stream, 3D Tele-Immersion Data," NSF Lake Tahoe Workshop on Collaborative Virtual Reality and Visualization, Oct. 26, 2003, pp. 1-6.

Reynard, Gail, "Vivid: A Symbiosis Between Virtual Reality and Video Conferencing," UKERNA Video Conferencing Workshop, Nottingham University, May 1996, pp. 1-11.

Yang, Ruigang et al., "Creating Adaptive Views for Group Video Teleconferencing—An Image-Based Approach," Proceedings of the 2004 ACM SIGMM Workshop on Effective Telepresence, 2004.

Watabe, Kazuo, "Distributed Multiparty Desktop Conferencing System: MERMAID," Proceedings of the 1990 ACM Conference on Computer-Supported Cooperative Work, 1990, pp. 27-38.

Weiser, Mark, "The Computer for the $21^{st}$ Century," Scientific American, Sep. 1981, pp. 94, 98-102, 104.

Jancke, Gavin et al., "Presenting to Local and Remote Audiences: Design and Use of the TELEP System," CHI Letters, vol. 2, Issue 1, Apr. 2000, pp. 384-391.

Gaver, William et al., "One is Not Enough: Multiple Views in a Media Space," Proceedings of the SIGCHI conference on Human factors in computing systems, Amsterdam, The Netherlands, 1993, pp. 335-341.

Greenhalgh, C. et al., "MASSIVE: A Collaborative Virtual Environment for Teleconferencing," ACM Transactions on Computer-Human Interaction, vol. 2, No. 3, Sep. 1995, pp. 239-261.

Yun Louis et al., "Architectures for Multi-Source Multi-User Video Compositing," Proceedings of the first ACM international conference on Multimedia, Anaheim, California, US, 1993, pp. 215-223.

Isaacs, Ellen et al., "What Video Can and Can't Do For Collaboration: A Case Study," Proceedings of the First ACM International Conference on Multimedia, Anaheim, California, US, 1993, pp. 199-206.

Morikawa, Osamu et al., "HyperMirror: Toward Pleasant-to-Use Video Mediated Communication System," Proceedings of the 1998 ACM Conference on Computer Supported Cooperative Work, Seattle, Washington, US, 1993, pp. 149-158.

Hollan, Jim et al., "Beyond Being There," Proceedings of the SIGCHI conference on Human factors in computing systems, Monterey, California, US, 1992, pp. 119-125.

Fish, Robert et al., "TheVideoWindow System in Informal Communications" Proceedings of the 1990 ACM Conference on Computer Supported Cooperative Work, pp. 1-11.

Buxton, Bill et al., "Europarc's Integrated Interactive Intermedia Facility (IIIF): Early Experiences," Proc. IFIP WG8.4 Conference on Multi-user Interfaces and Applications, Heraklion, Crete, Sep. 1990.

Buxton, W., "Telepresence: Integrating Shared Task and Person Spaces," Proceedings of the conference on Graphics interface '92, Vancouver, British Columbia, Canada, 1992, pp. 123-129.

Brittan, David, "Being There: The Promise of Multimedia Communications," in MIT Technology Review, May/Jun. 1992, pp. 42-50.

Bly, Sara et al., "Media Spaces: Bringing People Together in a Video, Audio, and Computing Environment,"Communications of the ACM, vol. 36, No. 1, Jan. 1993, pp. 27-46.

Chen, Milton, "Leveraging the Asymmetric Sensitivity of Eye Contact for Videoconferencing," Proceedings of the SIGCHI conference on Human factors in computing systems: Changing our world, changing ourselves, Minneapolis, Minnesota, US, 2002, pp. 49-56.

Ahuja, S.R. et al., "The Rapport Multimedia Conferencing System," Conference Sponsored by ACM SIGOIS and IEEECS TC-OA on Office Information Systems, Palo Alto, California, US, 1998, pp.1-8.

Kuzuoka, Hideaki et al., "Agora: A Remote Collaboration System That Enable Mutual Monitoring," CHI '99 Extended Abstracts on Human Factors in Computing Systems, Pittsburgh, Pennsylvania, US, 1999, pp. 190-191.

Tang, John et al., "Why do Users Like Video? Studies of Multimedia-Supported Collaboration," Computer Supported Cooperative Work (CSCW), 1992, 1, pp. 163-193.

Zotkin, Dmitry et al., "Smart Videoconferencing," IEEE International Conference on Multimedia and Expo (III), vol. 3, New York, NY, US, 2000.

Okada, Ken-ichi et al., "Multiparty Videoconferencing at Virtual Social Distance: MAJIC Design," Proceedings of CSCW '94. Chapel Hill, NC: ACM, 1994, pp. 385-393.

Jancke, Gavin et al., "Linking Public Spaces: Technical and Social Issues," Proceedings of the SIGCHI Conference on Human Factors in Computing Systems, Seattle, Washington, US, 2001, pp. 530-537.

Dourish, Paul et al., "Portholes: Supporting Awareness in a Distributed Work Group," Proceedings of the SIGCHI Conference on Human Factors in Computing Systems, Monterey, CA, US, 1992, pp. 541-547.

Takemura, Haruo et al., "Cooperative Work Environment Using Virtual Workspace," Proceedings of the 1992 ACM conference on Computer-supported Cooperative Work, Toronto, Ontario, Canada, 1992, pp. 226-232.

Tang, John et al., "Video WhiteBoard: Video Shadows to Support Remote Collaboration," Proc. Human Factors in Computing Systems, 1991, pp. 315-322.

Tang, John et al., "Supporting Distributed Groups With a Montage of Lightweight Interactions," Proceedings of the 1994 ACM Conference on Computer Supported Cooperative Work, Chapel Hill, North Carolina, US, 1994, pp. 23-34.

Tang, John et al., "Montage: Providing Teleproximity for Distributed Groups," Proceedings of the SIGCHI conference on Human Factors in Computing System: Celebrating Interdependence, Boston, Massachusetts, US, 1994, pp. 37-43.

Gagen, Martin, "Interactive Telepresence Case Studies," Teliris Ltd., New York, NY, US, Jun. 2002, pp. 1-8.

* cited by examiner

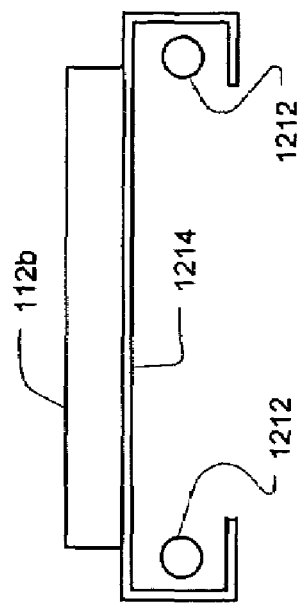
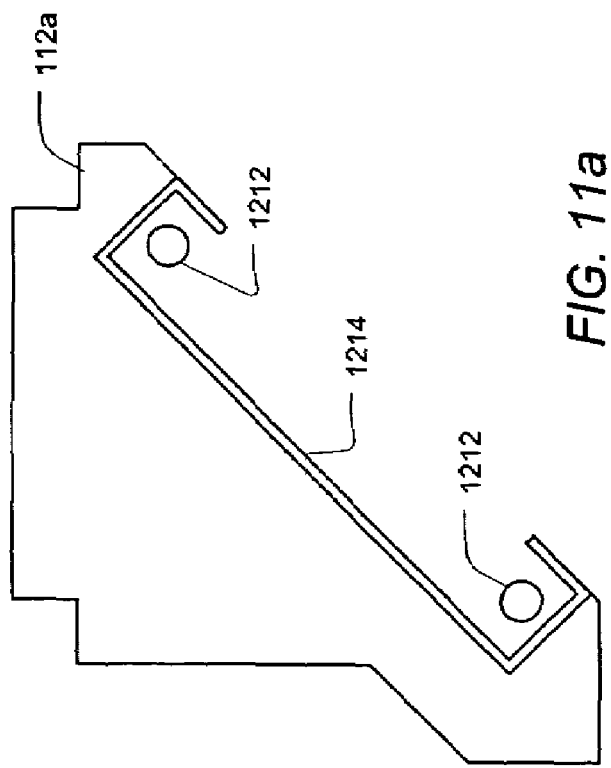

VIRTUAL CONFERENCE ROOM

BACKGROUND OF THE INVENTION

1. Field of the Invention

The present invention relates to video conferencing generally and, more particularly, to an enhanced video conferencing system and method that provides the illusion to the video conference participants located at different sites of being in the same physical space, such as being in the same room.

2. Description of Background Art

Conventional video conferencing facilities do not provide video conference participants located at different locations with the perception or feeling of being in the same physical space. Typically, a video conference system includes one or more standard definition cameras, and one or more television-sized monitors in each room. The cameras are located to capture an image of a view of an entire room (a source room) including its participants and to send the captured image to the video monitors in a destination room. The camera is typically located at one remote end of the source room, such as mounted on a wall or placed above the display monitors. The situation is generally the same in the destination room. The overall approach is simply to enable participants in each room to see each other on their respective video monitors, much like watching television. Where the camera is set to capture an image of the entire room, the participants in that room often appear small and remote to the viewers in the destination room. Where the camera is zoomed to capture the face of one or the participants, then it appears oversized in scale, and without any of the context of the rest of the participants. In particular, the viewers in the remote room cannot see the reactions, body language or other activity of the participants in the source room when the camera is zoomed in on only one of the participants there. Overall, no effort is made to create the perception of a single shared physical space between the participants where participants in both rooms can see the entire other room in a realistic and properly scaled fashion.

Further, the television-to-television model of current video conferencing systems is not at all conducive to how individuals normally interact in a group setting, such as in a group meeting. In actual physical meetings, individuals make eye contact with each other, use body language and other non-verbal cues. The typical arrangement of a conventional video conference room all but makes realistic eye contact between individual participants impossible, and either overly exaggerates or suppresses body language and other non-verbal cues. A participant does not get the feel of realistic eye contact when looking at the enlarged face of another person on a television monitor. Likewise, there is a feeling of eye contact when the camera is zoomed out to capture the entire source room. The result is a rather primitive form of video conferencing where participants rely primarily on voice and much less on useful visual information and cues in order to communicate and which thereby fails to convey much of the emotional content experienced with "in-person" meetings.

Further shortcoming of many conventional video conferencing systems include quite poor quality images, most often with low resolution due to bandwidth limitations, inability to properly handle simultaneous dialog, and improper lighting, and poor sound due to improper acoustics.

Moreover, the equipment of such conventional video conferencing systems can be obtrusive, with no effort made to hide the video conferencing equipment. Most video conference systems are sold in a cart configuration, with one or two video monitors mounted on top of a rolling or fixed stand, which is then placed at one of end of the conference room; the camera is typically mounted above the monitors, sometimes in a large cabinet that houses a motion tracking system and multiple microphone array. Because this equipment is so obtrusive, communication may be hindered because the participants feel like they are talking to a camera rather than another person and may be camera shy.

Furthermore, conventional video conferencing facilities are typically unable to capture and transmit images with high fidelity resolution. In many video conferencing applications, it is desirable to be able to view an image with high resolution in order to see the details of such image. For example, in the film industry, a director may wish to view and review the details of sketches or "storyboards" from a remote location and also to be able to discuss and collaborate on such storyboards in a video conference setting. Another example, in the area of technical design, an engineering team at one location may wish to view and discuss via video conferencing images on a computer screen, including lines of code, CAD drawings, schematics and/or other detailed figures with another engineering team located at a remote location. Because conventional video conference facilities typically use a standard definition camera located at one remote end of a conference room for capturing an image of the entire room, they are unable to capture and transmit images within the conference room with high fidelity resolution. Such conventional video conference systems are, at best, sufficient for capturing the rough outlines of participants in a conference room, but insufficient for capturing the details of a storyboard, lines of code, a CAD drawing, a schematic or any other detailed figures.

All of the above shortcomings substantially reduce the effectiveness of video conferencing as a way for remote individuals to collaborate, communicate and share ideas.

SUMMARY OF THE INVENTION

The present invention overcomes the deficiencies and limitations of conventional video conferencing by providing an enhanced video conferencing experience that provides the video conference participants located at different sites with the perception being in the same room visually as well as acoustically and permits the sharing of detailed images requiring high fidelity resolution. The virtual conference room results from the overall perception and impression of the participants being in a single shared space.

In one embodiment of the invention, two video conference rooms are provided in which each room includes a large format display system for displaying images from the other room and one or more cameras for capturing images from the room. The large format display system preferably spans most or all of one wall of the room. In each room, one of the cameras is situated at a location near the middle of the display system, with a mechanism for capturing an image at or about the anticipated eye level of the participants and oriented toward the conference room. Preferably, the location of each mechanism for capturing the image is such that the participants tend to look directly at such mechanism, or portion thereof, when looking at the large format display system. The location of the camera results in an image of the participants with the proper perspective and scale as if they were looking directly at the participants in the other room. This configuration has the effect that when the participants in one conference room look at an image of the other conference room displayed on the large format display system, they have the impression of looking directly into the other room, instead of looking at a conventional video conference monitor and cart. This perception creates the illusion of a shared physical space. To the participants in the other conference room, it appears that the other participants are looking directly at them, effectively making eye contact. This further enhances the illusion of shared space.

The large format display system further enhances the effect of the participants sharing a common physical space by presenting the images of the participants at or near "life size," thereby enabling the participants to see facial expression, body language and other non-verbal cues at a realistic scale. Each room preferably has a high quality audio system to capture effectively the participants' voices and any other sounds in the room, and the video conference equipment is further preferably hidden to avoid any artificial obstacles in communication between the participants in the different conference rooms. For example, in one embodiment, the large format display system is built into an entire wall, the image is rear-projected on a display screen; the camera is also hidden behind the display screen and exposed through an aperture in the display. The aperture is positioned so its location corresponds to a portion of the image from the other room that is visually insignificant (i.e., showing a portion of the image from the other room that is not of interest to the participants). An example of visually insignificant content might be a control panel or object sitting near the center of the table. Because of the visually insignificant nature of the image of this object, the participants do not notice that they are looking at the camera when making eye contact with the participants in the other room.

In another embodiment, the camera may be located on or under the floor at a position corresponding approximately to the horizontal middle of the large format display system and adjacent to the large format display system, with the lens of the camera directed upward. In this embodiment, the large format display system does not have an aperture to receive the lens. Instead, the camera system uses a half mirror beam splitter that is positioned above the lens, at about or about the anticipated eye level of the participants and angled to project the image of the conference room and its participants on the camera lens. The half mirror beam splitter further permits the participants in the conference room to view through the half mirror beam splitter so as not to obstruct the view of the image projected on the display system behind the beam splitter. By taking steps to hide the video conferencing equipment, including camera, lens and projector, participants do not notice that they are being recorded, and do not feel "camera shy," as is common with conventional video conferencing systems.

In a further embodiment, the video conference room preferably has the ability to provide high fidelity resolution images of items in pre-determined areas of the conference room. Being able to capture images with high fidelity resolution in video conferencing applications can be very useful. For example, as discussed above, in the film industry, a director may wish to view and review the details of sketches or "storyboards" from a remote location and also to be able to discuss and collaborate on such storyboards in a video conference setting. Also, in the area of technical design, an engineering team at one location may wish to view and discuss via video conferencing images on a computer screen, including lines of code, CAD drawings, schematics and/or other detailed figures, with another engineering team located at a remote location. In a preferred embodiment, the video conference rooms include an additional camera to zoom in on and capture only a region of interest with high fidelity resolution. This additional camera may include a high definition camera. Images captured using this additional camera can then be transmitted to the other conference room for viewing.

The result of using a video conference facility of the present invention is a virtual conference room, providing an enhanced video conferencing experience in which the participants feel as if they are immersed in a shared physical space and where visually and acoustically participants can feel as if they are directly looking at and speaking to each other including having eye contact with each other, discerning body language and other non-verbal cues and seeing detailed images from the other conference room.

The approach of the present invention is fundamentally different from the approach of conventional video conference systems. Conventional video conference products are complete, stand-alone systems for one room that make no assumptions about the physical layout, content or arrangement in the other room. The only assumptions made of the other room are to the video and audio standards (e.g., format, encoding, protocols, etc.), performance and bandwidth. In order to create a conventional end-to-end solution between two rooms, the conventional approach combines two complete stand-alone systems. The result limits the overall ability to create the illusion of shared physical space and to collaborate. In contrast, the present invention involves the overall design of both rooms including their physical layouts, contents and arrangements of items within the rooms. As such, the present invention is able to create the illusion of a shared physical space (including "eye-to-eye" contact among participants) and to hide the video conference equipment such as cameras.

The features and advantages described in this summary and the following detailed description are not all-inclusive. Many additional features and advantages will be apparent to one of ordinary skill in the art in view of the drawings, specification, and claims hereof. Moreover, it should be noted that the language used in this disclosure has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIGS. 11a and 11b are cross sectional views of the side lighting panels.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
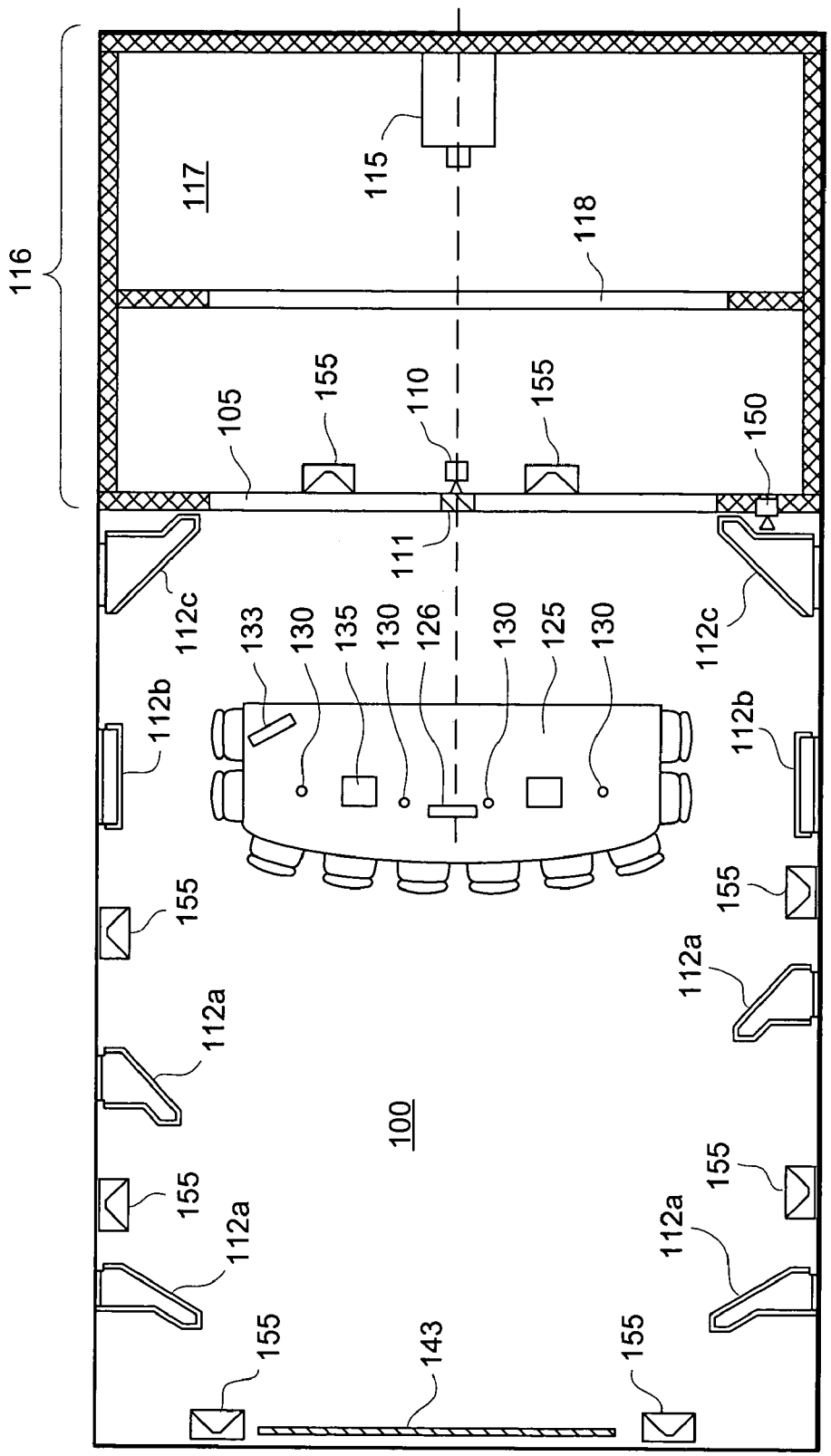
FIG. 1 is a plan view of the physical layout of a video conference room in a first embodiment.
Figure 2:
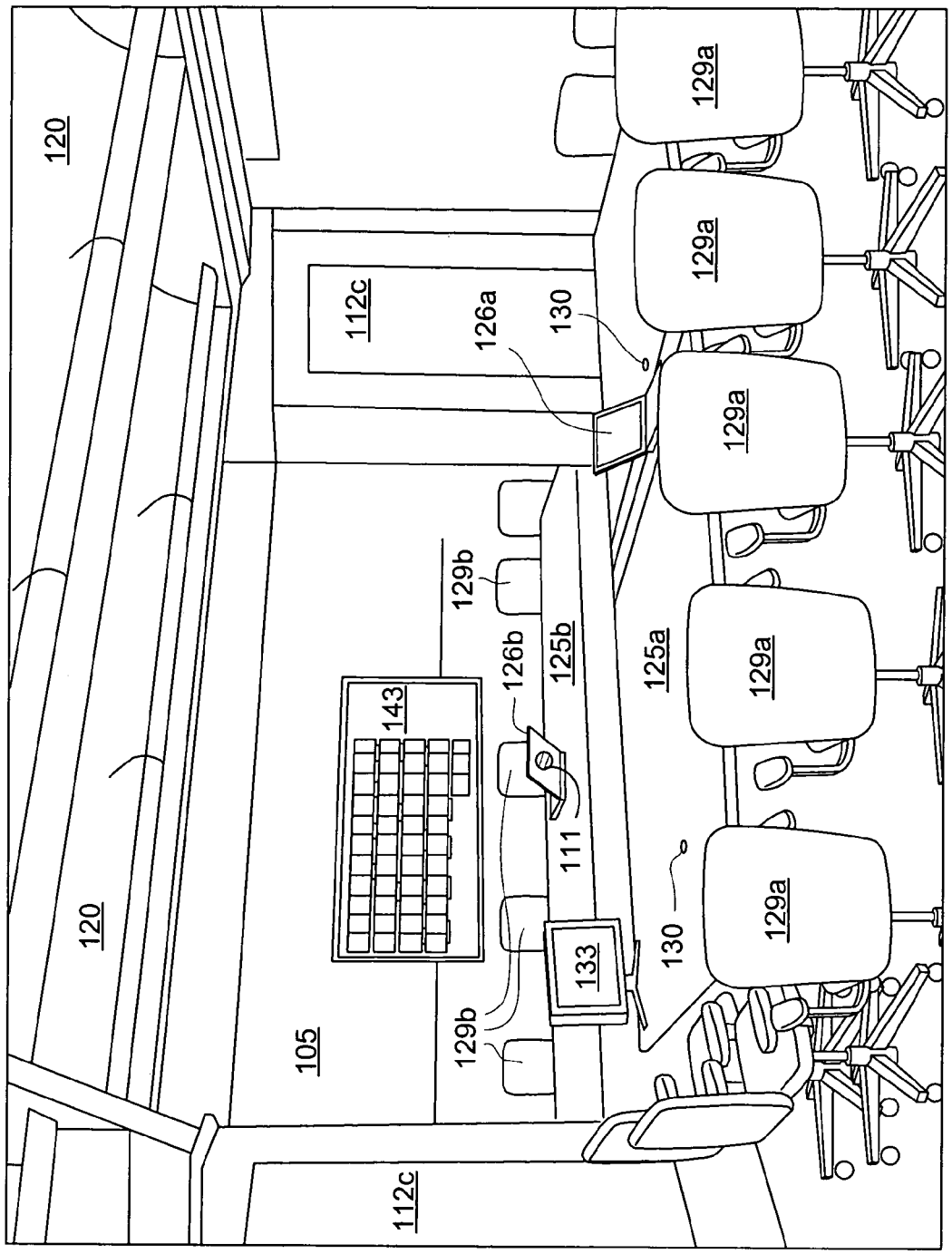
FIG. 2 is a perspective view of the video conference room.
Figure 3:
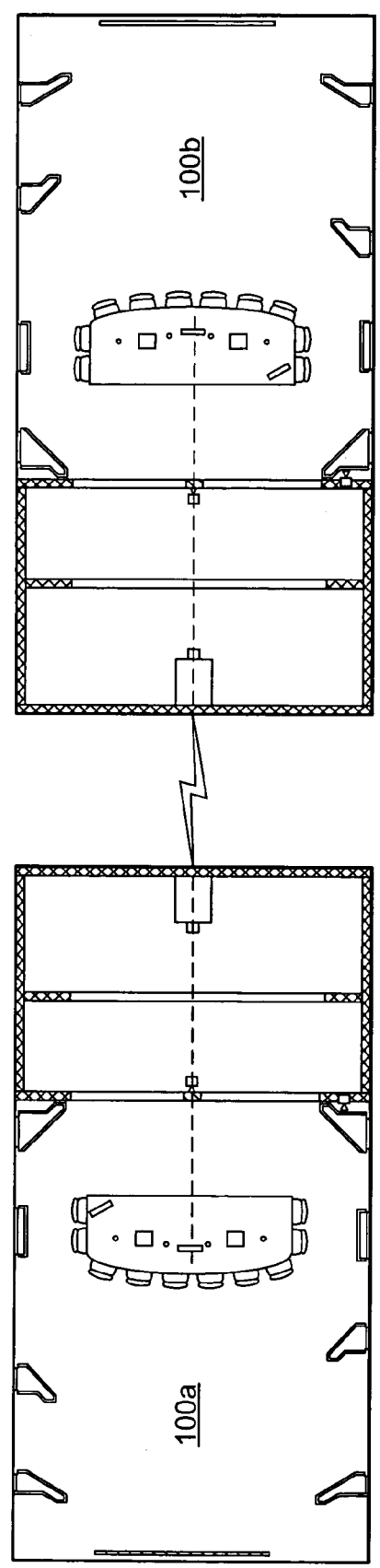
FIG. 3 is a plan view showing the configuration of two conference rooms connected over a network.

FIG. 1 illustrates a plan view and FIG. 2 provides a perspective view of a physical layout of a video conference room 100 in a first preferred embodiment. This video conference room 100 is electronically coupled over a network connection to another video conference room having substantially similar configuration to permit the transmission of images and sound between the conference rooms. This overall configuration of two conference rooms is shown in FIG. 3; the particular illustrated mirror-image orientation of the two rooms 100 is not a requirement of the invention since in fact the rooms are connected over a network, and their physical orientation to each other is irrelevant.

As shown in FIG. 1, this conference room 100 has a first camera 110 and a large format display system 116. The lens of the first camera 110 is directed toward the conference room 100 and its participants. The large format display system 116 includes a projection display device 115 for projecting an image from the other conference room and a projection screen 105 on which the image is projected. In the embodiment shown in FIG. 1, the projection display device 115 is placed behind the projection screen 105, and the image from the other conference room is rear-projected onto the projection screen 105. Preferably, the projection device 115 is placed in a separate room 117, which acoustically isolates the noise generated by the projection device 115, and projects the image through a glass panel 118. Note that the image need not be rear-projected. Any technique known in the art for projecting an image onto a screen may be used including projection by use of mirrors, multiple-monitor video walls, front projection, or the like. The projection screen 105 is built into and substantially the size of the front wall of the conference room 100. When the image of the other conference room is projected onto this screen 105, with life size images of the other room, the screen 105 becomes visually un-obtrusive, and the other room appears to be physically connected to the conference room itself. Life size images further enable the participants to see facial expression, body language and other non-verbal cues at a realistic scale, thereby promoting the feeling by the video conference participants of a shared common physical space at the appropriate level of resolution and magnification without either unnecessary exaggeration (from zooming) or suppression of details (from excessive wide angle).

As shown in FIG. 1 and more clearly in FIG. 2, the projection screen 105 has an aperture 111 through which the lens of the first camera 110 can view the room. Behind the screen 105, the camera 110 is supported on a monopod, pipe, or other rigid beam-like support, having a narrow (e.g., less than 1") profile. The wiring for the camera 110 is run down the length of the support. Other than the aperture 111, there are no preferable interruptions or obstacles to the display of the image from the other conference room on the projection screen 105. In a preferred embodiment, the aperture 111 and camera lens are located above the height of the top of the conference table 125, at or about the eye level of the participants as they would be seated at the table 125, and at a horizontal position at or near horizontal middle of the projection screen 105. In one embodiment, the location of the aperture is just about eye level, at about 41 inches. The distance from the aperture 115 to the front edge of the table 125 is about 14 feet. This places the aperture 111 and the camera 110 at about the middle where the image of the participants from the other conference room would be shown on the display 105, and hence at about the middle of where the participants sitting at the table 125 would be looking. This results in the image of the participants in the one conference room having the appropriate perspective to the participants in the other room. The axis of projection of the projection device 115 is arranged to be substantially horizontally coincident with the axis of the camera lens of the camera 110, as illustrated by the dotted line in FIG. 1; vertical coincidence is not necessary. The focal length of the camera lens of the first camera 110 is selected to capture a field of view sufficient to cover the width of the room 100.

Figure 4:
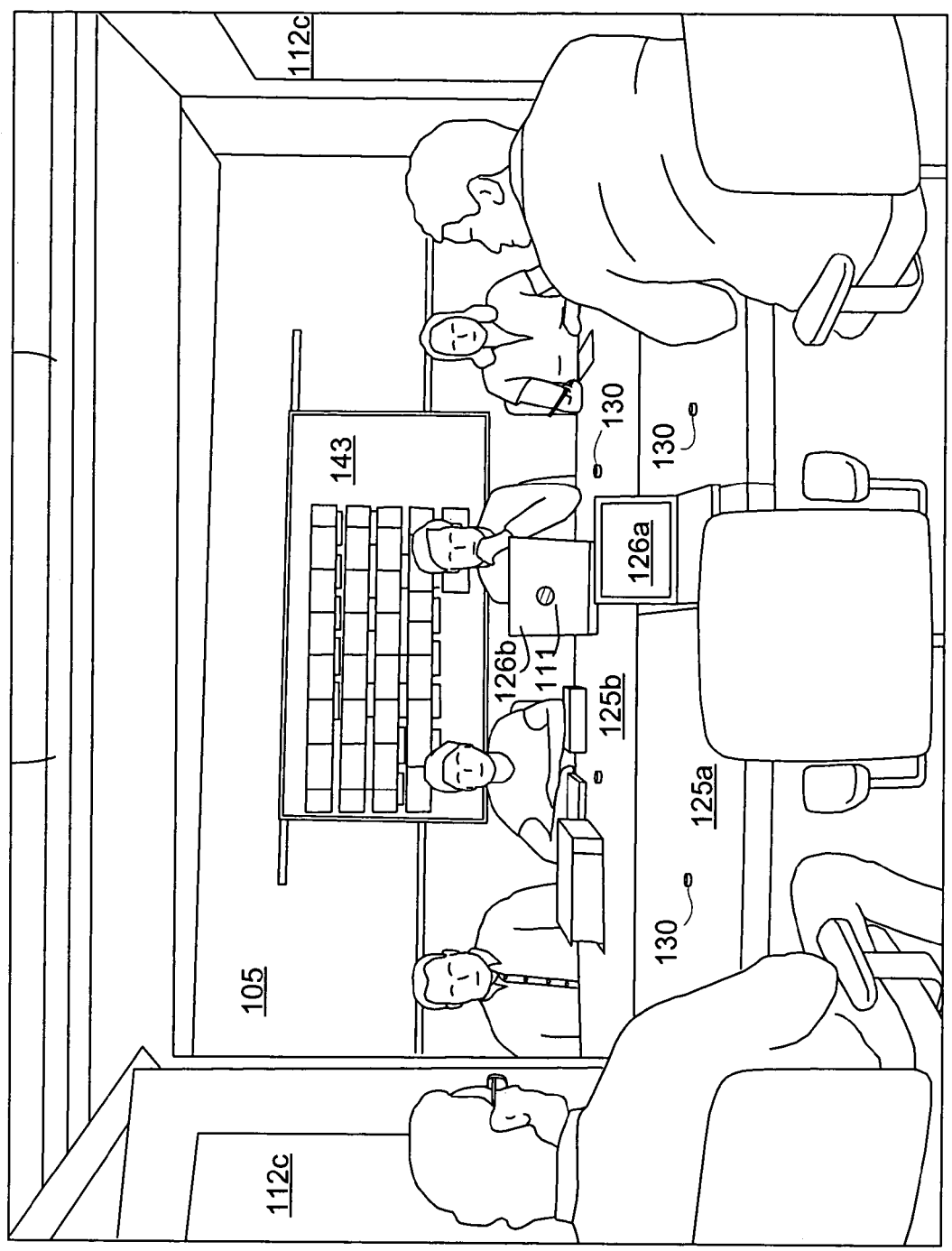
FIG. 4 is a perspective view of the video conference system in use.

FIGS. 2 and 4 illustrates the realistic effect created in the video conference room. FIG. 2 is a view from within a first conference room 100 of the image of the second conference room 100 the display 105, with no participants in either room. In the first conference room 100, there is table 125a surrounded by chairs 129a. On the display 105 can be seen the table 125b and the chairs 129b in the second conference room 100. In the back of the second conference room 100b, there can be seen a display board 143 on which there are displayed various artwork drawings. Notice how the overall width and height of the display 105, along with the relative size and perspective of the image of the table 125b, chairs 129b, and display board 143 are such as to make the second room 100b appear to be physically connected to the first conference room 100a, as if it were just beyond the side panels 112c. FIG. 4 illustrates the conference room system in use, with participants in both rooms. Again, the participants in the first room 100 see the image of the participants from the second room 100 on the display 105. Here too the relative size and perspective of the image gives the feeling and appearance to the participants in the first room that the participants from the second room are physically present, and directly across the table 125 from them. This sense of immediate presence considerably enhances the collaborative nature of a video conference between the participants and eliminates the "talking head in a TV" effect common to conventional video conference systems.

As shown in FIG. 1 and more clearly in FIG. 2, the lens of the image capture in the aperture 111 is located approximately in the horizontal middle of the projection screen 105, and at or about the eye level of the participants. This results in some portion of the image projected on the projection screen 105 from the other conference room being displaced by the body of the camera 110 and the aperture 111. The displaced portion of the image will typically correspond to a location at or near the horizontal middle of the screen 105 and at a predetermined height. To make the aperture 111 and the loss of this portion of the image less noticeable, the rooms 100 and their contents are configured so that this portion of the image contains a visually insignificant area. This may be done, for example, by placing an item or field 126 in each conference room at approximately the above described location, for example, such as a control panel 126 on a table 125. The control panel is used to operate the video and audio equipment for the rooms, as such is not noticed by the participants. Such control panels 126a,b are present on the tables 125a,b in both conference rooms, as can be seen in FIG. 2. Whatever form the item 126 has, it preferably has dark rear coloration so as to make the aperture 111 (which itself will be dark) less noticeable. Because of the visually insignificant nature of the item 126, the participants do not notice the camera when looking at the image of the participants in the other conference room and facilitating the feeling of being in the same room, instead of being "on camera." Because of the similar configuration of the conference rooms, the result is the same for the participants in the other conference room. Also, the lens of the camera 110 may be coated with an anti-reflective coating to minimize glare, thereby further making the lens 110 less obtrusive. Alternatively, the aperture can have a non-reflective, transparent cover, behind which the camera 110 is situated.

In the preferred embodiment illustrated in FIG. 1, the conference room 100 has a high quality audio capture system for capturing sound from the conference room 100 and a high quality audio amplification system for projecting sound from the second conference room 100. The audio capture system comprises one or more microphones 130 distributed throughout the conference room 100. Preferably, at least one of the microphones 130 is located at the table 125 in the conference room to pickup conversations of participants that may sit at the table 125. The microphones 130 may be wired or wireless. In one embodiment, the microphones 130 are built into the table 125 itself, again making it less obtrusive and noticeable to the participants. This embodiment is shown in FIGS. 2 and 4, where the microphones just slightly protrude from the surface of the table 125. The audio amplification system comprises one or more speakers 155, distributed around the conference room 100. Preferably, at least one of the speakers 155 is located behind the projection screen 105, so that the voices of the participants in the other conference room appear to come from the proper direction and height; for example, the speaker may be placed at or about the height of where the head of a seated participant in the other room would appear on the display 105. Further, the other speakers 155 are preferably placed so as to be hidden from view within the conference room 100, such as behind acoustically transparent panels. The audio capture system and the audio amplification system also preferably permit simultaneous dialog between the conference rooms, without cutting out due to participants in both rooms talking at the same time. In other words, if a participant in one conference room is talking at the same time as a participant in the other conference room, both participants are heard in both conference rooms. The rooms 100 are further configured to have a reverberation time, frequency response, and other acoustic characteristics that approximate the response of a larger, single conference room. The impression of the resulting sound field is to have the voices and other sounds from the second conference room sound as if they are being made in a single room with about twice the actual physical volume, thereby further reinforcing the perception of a shared physical space.

As further shown in FIG. 1, the conference room 100 has a second camera 150 for capturing with high definition resolution a display board 143 or other item located at a pre-determined location within the conference room 100, such as along the rear wall. The second camera 150 is preferably a high definition camera with one or more preset focus locations, such as on the display board 143. Optionally, the camera 150 may have a preset focus on a maquette stand (not shown), used to display models, products, or other items of interest. In one embodiment, the second camera 150 is attached to the ceiling near the front of the conference room 100, off to one side, at about 10 feet from the floor, and 30 feet from the rear of the room 100. The second camera 150 need not be attached to the ceiling, but may be placed anywhere so that its field of view includes the location requiring high resolution imaging. Once captured by the second camera 150, the image may be transmitted to the other conference room for viewing.

To further the perception of the participants sharing a physical space (e.g., being in the same conference room as participants in the other conference room), it is preferable that the conference rooms have similar furnishings (e.g., tables 125 and chairs 129), wall color, wall surfaces, lighting and floor covering. Moreover, preferably the lighting is selected and the furnishings are arranged and located within the room in a manner to optimize the quality of the image captured by a camera.

Figure 5:
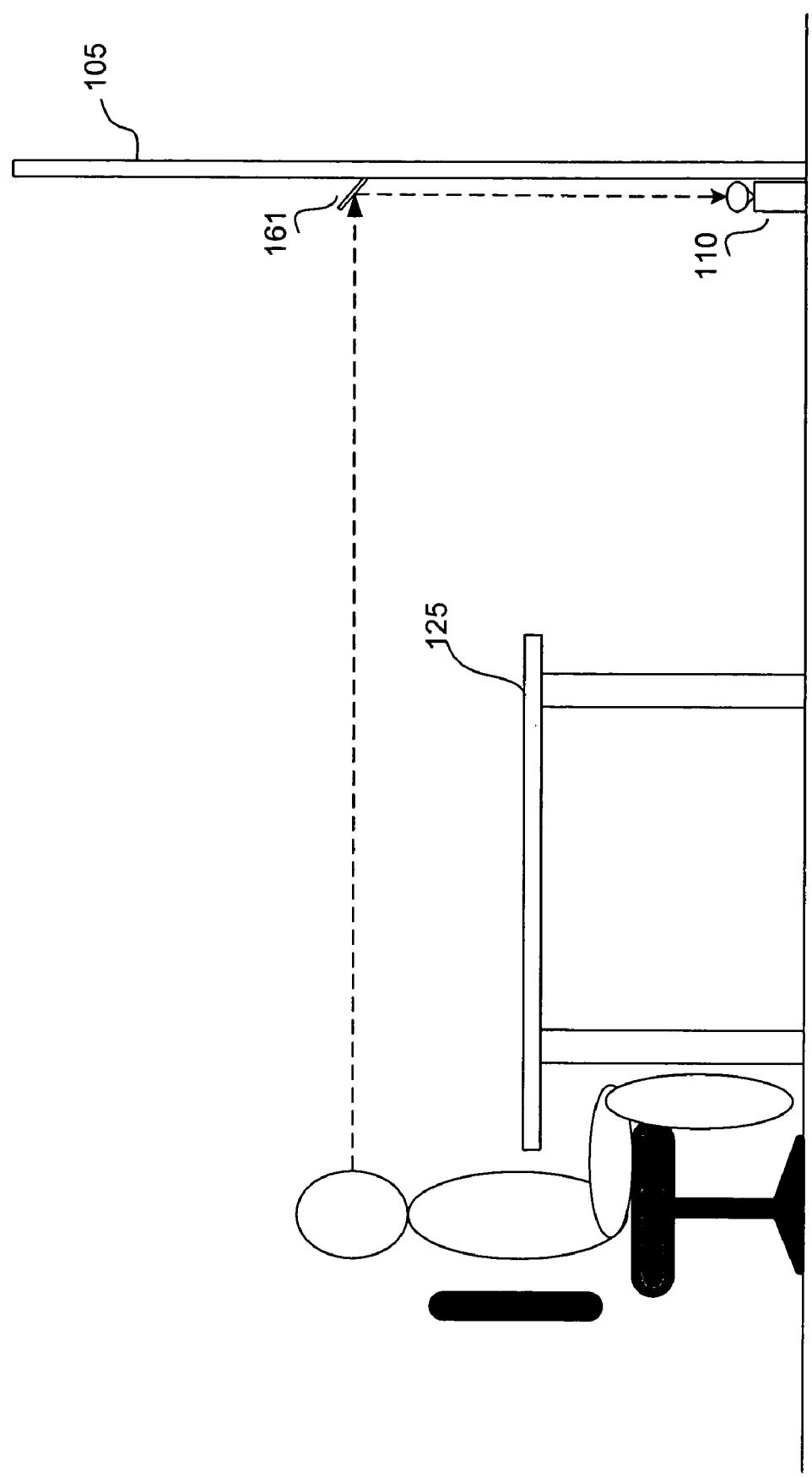
FIG. 5 is an elevation view of a second embodiment of the camera apparatus.

In another embodiment as shown in partial plan view in FIG. 5, the camera 110 is not placed behind the display 105. Instead, the camera 110 is positioned on (or in) the floor directly in front of the display 105, facing upward, and focused on a half mirror beam splitter 161. Together, the camera 110 and beam splitter comprise a camera system. The beam splitter 161 oriented at an angle with respect to and positioned near horizontal middle of the large format display system 116, at a height at or near eye level of the participants in the conference room, and with a field of view includes the conference room 100. The half mirror beam splitter 161 captures the image of the conference room 100 and the participants and reflects the image into the lens of the camera 110. The half mirror beam splitter 161 is at least partially transparent to the participants in the conference room 100, so that they can see display 105 through the splitter 161. The beam splitter 161 can be supported on a rigid beam or pipe (not shown) placed immediately in front the display 105. The beam splitter 161 is shaped and polished using techniques known in the art so as to make it as visually unobtrusive as possible. As illustrated in FIG. 5, the camera 110 is located on the floor of conference room 100, but in other embodiments, the camera 110 may be located in other positions. For example, a ceiling mounted camera and lens would operate as well, with the accompanying reversal of the beam splitter 161.

Figure 6:
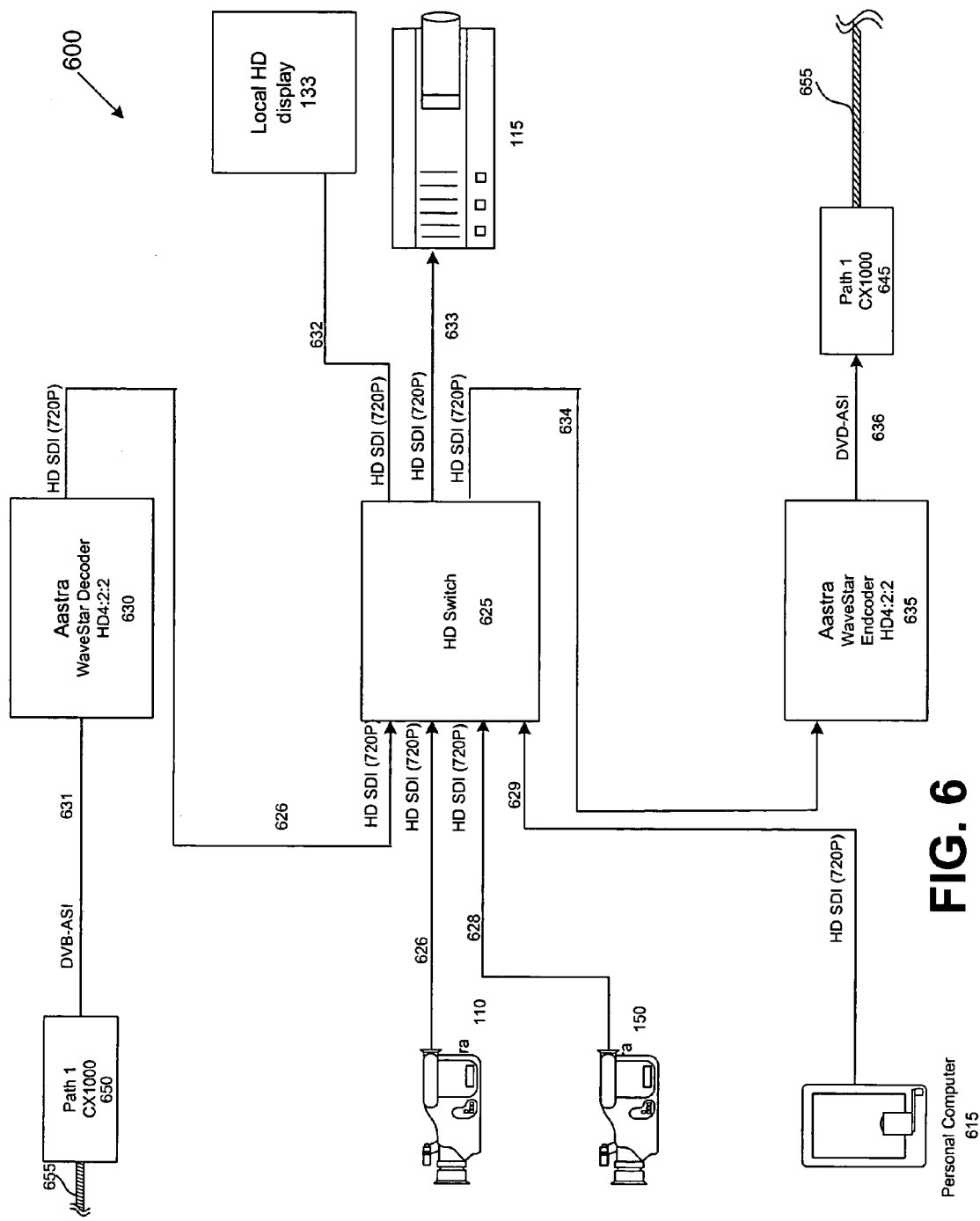
FIG. 6 is a block diagram of a preferred embodiment of the video capture and transmission components in the present invention.

FIG. 6 is a block diagram 600 of a preferred embodiment of the image capture and projection components in the present invention. As illustrated FIG. 6, these components include one or more cameras 110 and 150, a high definition switch 625, a decoder 630, an encoder 635, two internet protocol (IP) video gateways 645 and 650, an IP based network 655 and a projection display device 115. The cameras 110, 150 are studio quality video cameras, such as a Panasonic AK HC900 HD camera with progressive scan. The conference room camera 110 is coupled with a Fujinon HA13×4.5 lens, with a focal length of 4.5 to 59 mm, 13× zoom ratio. The second camera 150 uses a Fujinon HA17× 7.8 with a focal length of 7.8 to 133 mm. The IP based network 655 provides an electronic connection between the conference rooms. The high definition switch 625 has a plurality of input video signals 626–729, one video input signal from each camera or any other source of a video signal (e.g., computer 615 producing a video signal for a presentation for projection to the other conference room), and one video input signal from the other conference room 626. The high definition switch 625 also has three output signals 632, 633 and 634. One of the output video signals, 633, is coupled to the projection display device 115 in the conference room 100 and is used to project the video signal for viewing by the participants. Output 632 is used to provide a signal to local high definition display 133 (which is positioned on table 125); this allows the participants to see their own image without distraction, or to view graphics, presentations, the feed from camera 150, or other secondary materials provided by the other conference. The high definition switch 625 is capable of selecting one input video signal among a plurality of input video signals. The projection display device 115 can be a Christie Roadster S9, from Christie Digital Systems, Inc.

The decoder 630 has an input 631 and an output 626. The output 626 of the decoder 630 is coupled to an input of the high definition switch 626. The decoder 630 is capable of decompressing a video signal from its input 631. The encoder 635 has an input 634 and an output 636, the input 634 is coupled to one of the outputs 634 of the high definition switch 625. The encoder 635 is capable of compressing a video signal from its input 634. Preferably, the decoder 630 is an Aastra Wavestar decoder that converts MPEG-2 4:2:2 format into a video signal, and the encoder 635 is an Aastra Wavestar encoder that converts a video signal into MPEG-2 4:2:2 format.

The IP video gateways 645 and 650 each have an output, 655 and 631 respectively, and an input, 636 and 655 respectively. One of the IP video gateways, 650, has an output coupled to the input 631 of the decoder 630 and an input coupled to an IP based network 655. This IP video gateway 650 is capable of taking IP packets from the IP based network 655 and producing a video signal at the output 631.

The other IP video gateway 645 has an input coupled to the output of the encoder 636 and an output coupled to the IP based network 655. This IP video gateway 645 is capable of taking a video signal from its input 636 and breaking the video signal into IP packets for transmission of the IP packets on an IP based network 655. The IP video gateways may be Path 1 Network Technologies Inc.'s Cx1000 IP video gateway.

Figure 7:
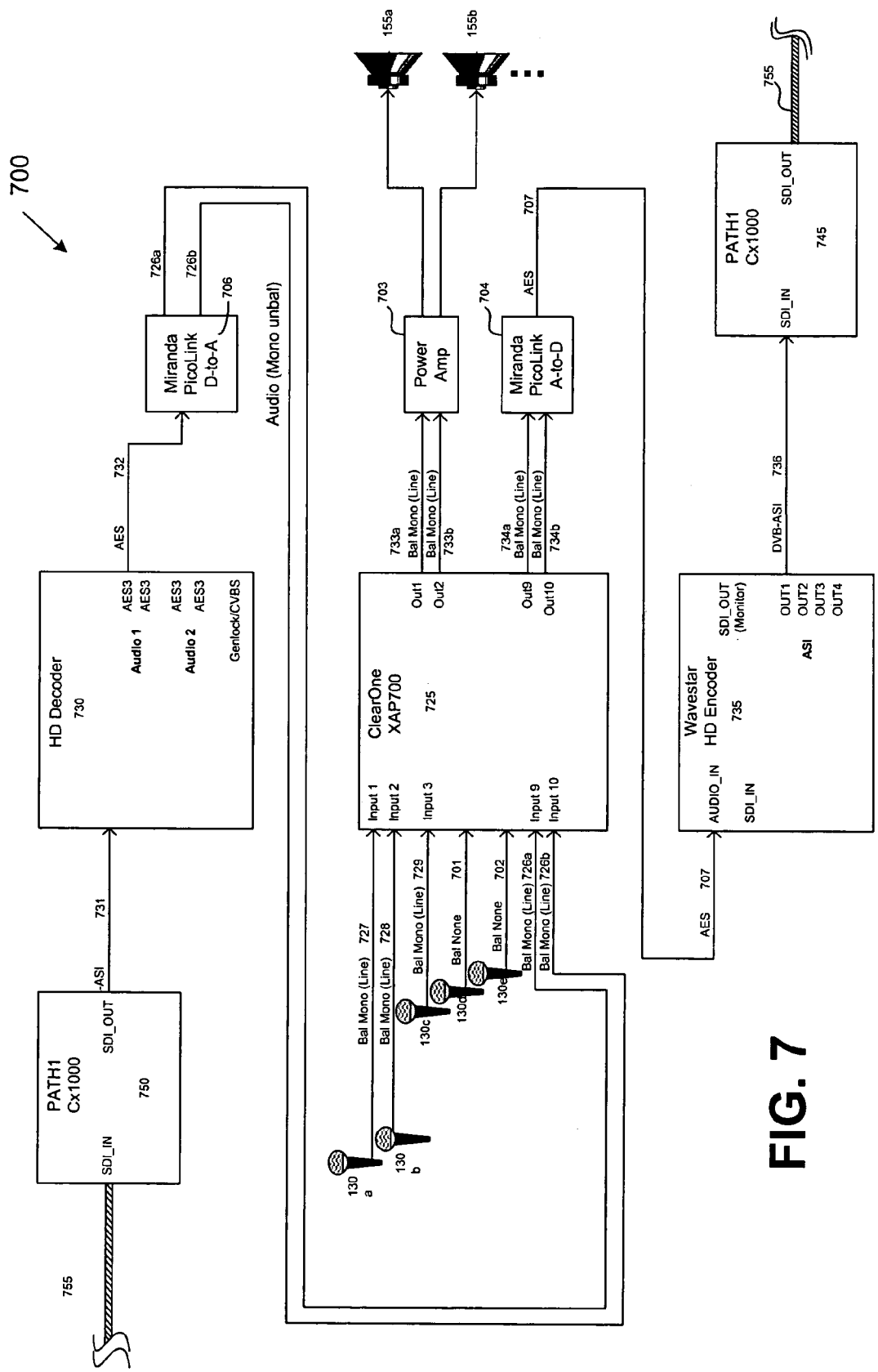
FIG. 7 is a block diagram of a preferred embodiment of the audio capture system and the audio amplification system in the present invention.

FIG. 7 is a block diagram of a preferred embodiment of the audio capture system and the audio amplification system in the present invention. The audio capture system and the audio amplification system enable the capture and projection of sound respectively. As shown in FIG. 7, these systems include an audio switch 725, a decoder 730, an encoder 735, two IP audio gateways 745 and 750, an IP based network 755, microphones 130 and speakers 155a and 155b.

The audio switch 725 has a plurality of input audio signals, one audio input signal 727, 728, 729, 701 or 702 from each microphone 130a–e in the conference room 100 and two audio input signals 726a and 726b from the other conference room. The audio switch 725 also has output signals 733a, 733b, 734a and 734b. One pair of output audio signals, 733a and 733b, is coupled to a power amplifier 703 for amplification and then projection through the speakers 155 in the conference room 100. The other pair of output audio signals, 734a and 734b, is coupled to an analog to digital converter 704 or any other analog to digital converter known in the art. The audio switch 725 is capable of selecting one input audio signal among a plurality of input audio signals and mixing several input audio signals to produce a single output audio signal. In a preferred embodiment, the high definition switch is a ClearOne Communications, Inc., XAP 700 switch that has distributed echo and noise cancellation, filtering and mixing capabilities.

The decoder 730 has an input 731 and an output 732. The output 732 of the decoder 730 is coupled to a digital to analog converter 706 or any other digital to analog converter known in the art. The outputs 726a and 726b of the digital to analog converter 706 are input into the audio switch 725. The decoder 730 is capable of decompressing an audio signal from its input 731. The encoder 735 has an input 707 and an output 736. The input 707 is coupled to the output of the analog to digital converter 704. The encoder 735 is capable of compressing an audio signal from its input 707.

The IP audio gateways 745 and 750 each have an output, 755 and 731 respectively, and an input, 736 and 755 respectively. One of the IP audio gateways, 750, has an output coupled to the input 731 of the decoder 730 and an input coupled to an IP based network 755. This IP audio gateway 750 is capable of taking IP packets from the IP based network 755 and producing an audio signal at the output 731.

The other IP audio gateway 745 has an input coupled to the output of the encoder 736 and an output coupled to the IP based network 755. This IP audio gateway 745 is capable of taking an audio signal from its input 736 and breaking the audio signal into IP packets for transmission of the IP packets on an IP based network 755. Preferably, the decoder 730 is an Aastra Wavestar decoder, the encoder 735 is an Aastra Wavestar encoder, the IP audio gateways, 745 and 750, are Path 1 CX1000 IP audio gateways, and the converters 704 and 706 are Miranda PicoLink analog to digital and digital to analog converters respectively.

Referring now to FIGS. 8–11, there are shown additional aspects of a conference room in regards to the lighting plan for providing suitable levels and types of lighting. Generally, the overall approach to lighting the conference room is to provide a well lit environment in which all participants are identifiable, without making the participants feel that they are being intensely lit under "stage lights." Further, the lighting plan ensures that extraneous light does not inadvertently light the screen 105, and thereby reduce image contrast. These aspects of the lighting design are achieved with a series of overhead lighting fixtures 120 arrayed on the ceiling of the room, a series of side panels 112 arrayed along the side walls of the room, and lighting under conference table 125.

Figure 8:
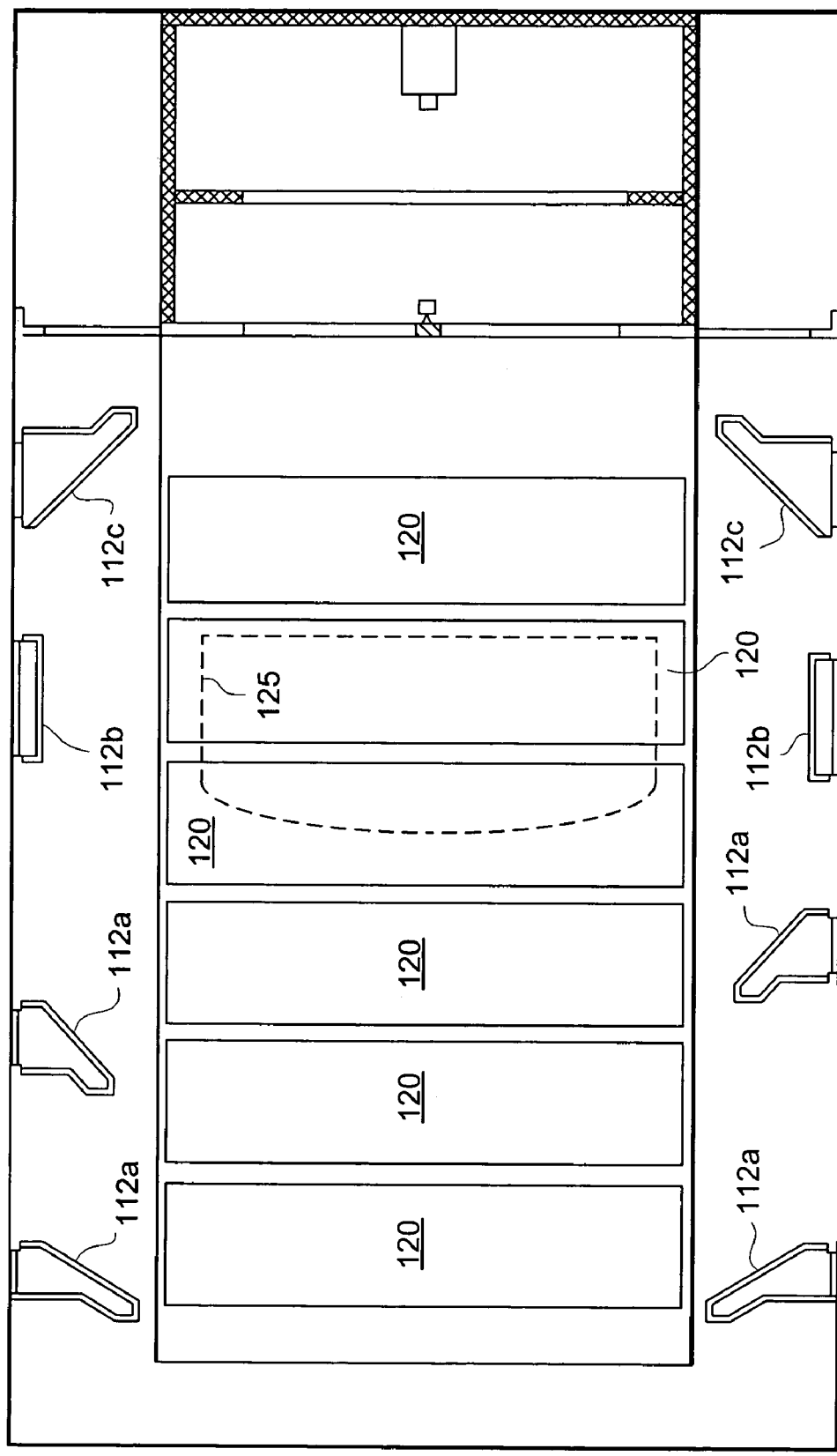
FIG. 8 is another plan view of the conference room, showing aspects of the lighting elements of the room.
Figure 9:
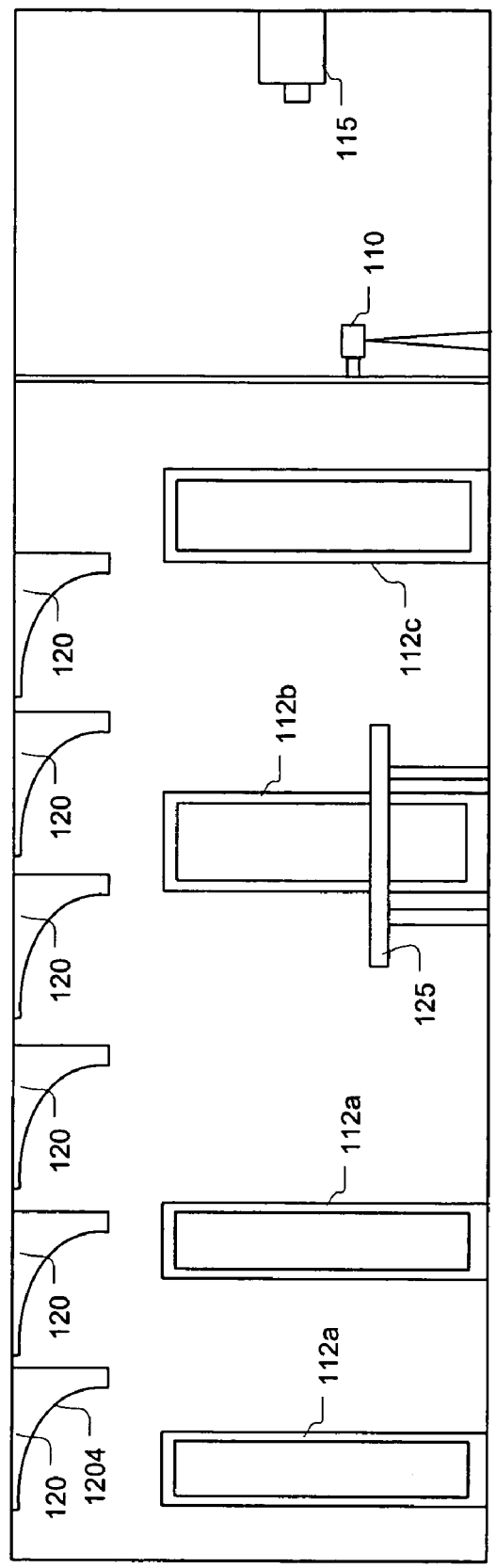
FIG. 9 is another elevation view of the conference room, showing further aspects of the lighting elements of the room.
Figure 10:
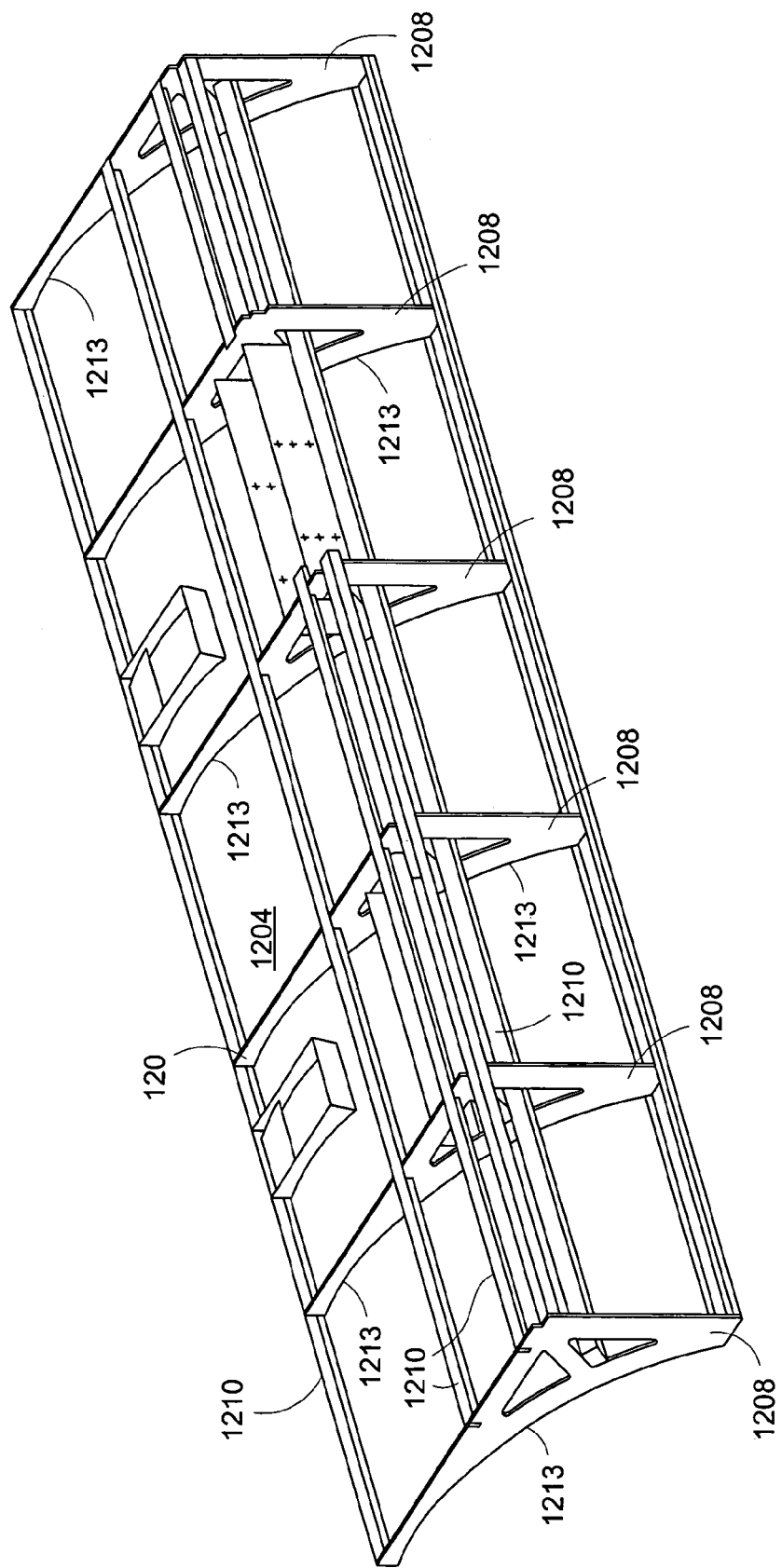
FIG. 10 is a perspective view of an overhead lighting fixture.

The lighting fixtures 120 are arrayed along the ceiling of the room, as shown in FIGS. 8 and 9. FIG. 10 illustrates a rear three-quarter perspective view of a single fixture 120. The fixtures 120 include a curved, or scalloped surface 1204 that is shaped to reflect light downward and backward. This provides strong diffuse lighting off the participants, while not directing lighting toward the screen 105, creating a shadow zone directly in front of the screen 105. As illustrated in FIG. 10, each fixture 120 includes a plurality of spaced apart vertical retainers 1208. Each retainer 1208 forms a right angle at the rear, with a curve front edge 1213. The curved surface 1204 is mounted to these curved front edges 1213. The retainers 1208 are coupled together with reinforcing lateral supports 1210. Each fixture 120 is then mounted to the ceiling. In one embodiment, the fixtures 120 are about 36 inch wide, and spaced apart by about 6 inches. Each fixture 120 preferably uses a single 40-watt F40T12 fluorescent light, with a high frequency ballast (not shown) and 3200K color temperature, mounted in front the surface 1204.

The side panels 112 are arrayed along the right and left side walls. Side panels 112a near the back of the room are angled forward towards the participants and provide diffuse side and back lighting. Side panels 112b are to the side of the conference table 125 and provide diffuse lighting of the sides of the participants and their faces. Side panels 112c near the front of the room are angled back towards the conference table, and provide diffuse frontal lighting of the participants. FIGS. 11a and 11b illustrate cross-sectional views of side panels 112a, 112b, showing the boxes 1214 having lights 1212 recessed into the sides of the boxes, so their light output is indirectly cast into the room reflected off the inside of the box, rather than directly onto the participants. The overall effect is to provide sufficient lighting to better reveal the facial features, and contours of the participants. Preferably, the lights 1212 are the F40T12 fluorescent lights, described above.

Finally, additional lighting is provided underneath the conference table 125. Rope lighting along the underside of the edges of the table makes the boundary of the table more discrete, and subtly lights the lower body parts of the participants, such as their legs and feet, making these more visible to the participants in the other room, without making them noticeably too bright. Two additional low wattage fluorescent lights may also be used under the tables, such as the fluorescents described above. The effect is intentionally subtle, so that the participants in the room do not feel overly lit up.

As illustrated in the various figures, the video conference system described above preferably operates with a large format display system 116 (including projection screen 105 and projection display device 115) and an image capture apparatus (e.g., camera 110) in each conference room 100a, 100b (as illustrated in FIG. 3), electronically coupled the two rooms together to bi-directionally communicate audio and video information as described in FIGS. 6 and 7. The camera system in each room (e.g., camera 110 and aperture 111, camera 110 and half mirror beam splitter 161) is located at a position that is substantially in the horizontal middle of the projection screen 105 and at a height at or about eye level of the participant as shown in FIGS. 2 and 5. Typically, this position within the conference room 100 is substantially medial to the display 105. The camera 110 is preferably substantially hidden from the view of the participant using the techniques described above. In a preferred embodiment, the line of sight from the participant to the approximate middle of the large format display system 116 is within the field of view of the camera 110 and is substantially unobscured by the camera 110. Moreover, the focal length of the camera of the camera 110 is selected to capture a field of view sufficient to cover the width of the room. This provides the illusion that the participant in one conference room is looking directly at a participant in the other conference room. As mentioned, it is preferable to include substantially similar furnishings in both conference rooms, arranged in a substantially similar manner, including similar furniture, floor covering, lighting, wall color and wall surfaces. This provides the illusion of sharing the same physical space.

The camera 110 in the second conference room 100b then captures an image of the second conference room 100b. The image gets transmitted to the first conference room 100a via the IP based network 755. The first conference room 100a receives the image from the second conference room 100b and projects the image onto the large format display system 116 for viewing by participants in the first conference room 100a. The image captured by the camera 110 is captured in such a manner so that, when the image is projected onto the large format display system 116 of the first conference room 100a, it appears to the participants there at or near life size, with the appropriate perspective, brightness, and color so that the participants in the second conference room 100b appear to be in the same physical space as the participants in the first conference room 100a.

Similarly, the camera 110 in the first conference room captures an image of the first conference room. The image gets transmitted to the second conference room via the IP based network 755. The second conference room 100b receives the image from the first conference room 100a and projects the image onto the large format display system 116 in the second conference room 100b for viewing by participants there. Again, the projected image is at or near life size and perspective and gives the illusion of these participants sharing the same physical space as the participants in the first conference room 100a.

Preferably the operation of the video conference system further includes capturing sound in one conference room using microphones 130, transmitting the captured sound to the other conference room, receiving the captured sound in the other room and projecting the sound throughout such other conference room using speakers 155. As described, the sound design results in the acoustic perception of the voices emanating from a larger single room, as would be the case if in fact the participants were in a single room together.

In another preferred embodiment, operating the video conference system includes capturing a high fidelity resolution image of an item (e.g, display board 143 or maquette stand) at a pre-determined location within a conference room 100, transmitting the captured high fidelity resolution image to the other conference room as described in FIGS. 6 and 7, receiving in the other conference room the captured high fidelity resolution image, and projecting the captured high fidelity resolution image on the large format display system 116 in the conference room for viewing by participants.

As will be understood by those familiar with the art, the invention may be embodied in other specific forms without departing from the spirit or essential characteristics thereof. For example, the particular division of functionality between the various modules or components may differ from that described herein, given the variety of audio, video, and communications software and hardware available, many different implementations of such elements may be used to practice the invention, in addition to those described above. Finally, the particular naming of the elements, apparatuses has been selected primarily to aid in the description of the invention, and is not mandatory or inherently limiting. Accordingly, the disclosure of the present invention is intended to be illustrative, but not limiting, of the scope of the invention, which is set forth in the following claims.

What is claimed is:

1. A video conference system, comprising:
a first conference room and a second conference room, the conference rooms electronically coupled together to permit transmission of images from each room to the other room for viewing, each conference room having:
 a large format display system for projecting images; and
 a camera positioned with respect to the large format display system to capture an image of the conference room and a participant in the room, without substantially obscuring the participant's view of the large format display system, so as to provide the perception that the participant in the room is looking directly at a participant in the other conference room;
 wherein the large format display system defines an aperture, the camera located behind the aperture;
 wherein the aperture is located so as to coincide with a visually insignificant area of the image of the other conference room as displayed on the large format display system;
 wherein the visually insignificant area corresponds to an image of an unobtrusive physical object located in the other conference room.

2. The video conference system of claim 1, wherein the camera is substantially hidden from the view of the participant in the conference room.

3. The video conference system of claim 1, wherein the camera is located substantially medial to the large format display system and at or above eye level of a participant in the conference room, the camera substantially hidden from the view of the participant in the conference room.

4. The video conference system of claim 1 wherein the aperture is located at a height at or about eye level of the participants and at a horizontal position at or near horizontal middle of the large format display system.

5. The video conference system of claim 1 wherein each conference room is electronically coupled to transmit sound to and to receive sound from the other conference room.

6. The video conference system of claim 1 wherein each conference room further comprises:
   an audio capture system for capturing audio from the conference room, the audio capture system having a microphone; and
   an audio amplification system for projecting audio in the conference room, the audio amplification system having a speaker.

7. The video conference system of claim 6 wherein:
   the audio capture system comprises a plurality of microphones distributed throughout the conference room;
   the audio amplification system comprises a plurality of speakers distributed around the conference room so the audio seems to emit from an image of a participant on the large format display system, and wherein the audio capture system and the audio amplification system are capable of permitting simultaneous dialog between participants in the first conference room and the second conference room.

8. The video conference system of claim 7 wherein at least one microphone is located in or on a surface of a table located in the conference room.

9. The video conference system of claim 1 wherein the large format display system comprises a projection display device and a projection screen, the screen having a front and a back, the front of the screen facing the conference room, the projection display device located behind the screen, facing the back of the screen.

10. The video conference system of claim 9 wherein the projection screen is substantially the front wall of the room.

11. The video conference system of claim 1 wherein the large format display system displays an approximately life-size image of the other conference room.

12. The video conference system of claim 1 wherein the camera is a high definition camera.

13. The video conference system of claim 1 wherein the first and second conference rooms contain similar furnishings, the furnishings arranged and located whthin the room in a manner to provide the perception of participants sharing a same physical space.

14. The video conference system of claim 1 wherein the first and second conference rooms contain similar wall color and surfaces to provide the perception of participants sharing a same physical space.

15. The video conference system of claim 1 wherein the first and second conference rooms are lighted to provide the perception of participants sharing a same physical space and to optimize the clarity of an image captured.

16. The video conference system of claim 1, wherein at least one conference room further comprises a second camera for capturing with high fidelity resolution an image of an item located at a pre-determined location within the conference room.

17. The video conference system of claim 16 wherein the second camera is a high definition camera.

18. The video conference system of claim 17 wherein the second camera is located where it can focus on the pre-determined location within the conference room, the predetermined location being the place where the item requiring high fidelity resolution image capture may be placed.

19. The video conference system of claim 1, the aperture having an anti-reflective, transparent cover.

20. The video conference system of claim 1, wherein a surface of the physical object facing the camera has a dark coloration and the view transmitted from the other conference room shows a physical object of a dark coloration.

21. A method of video conferencing between a first conference room and a second conference room, comprising:
   receiving in the first conference room an image of the second conference room;
   projecting the image onto a first large format display system in the first conference room at or near life size;
   capturing an image of the first conference room and a participant in the first conference room, without substantially obscuring the participant's view of the first large format display system, so as to provide the perception that the participant in the first conference room is looking directly at a participant in the second conference room; and
   transmitting the captured image to the second conference room for viewing;
   wherein the first large format display system defines an aperture, a camera for capturing the image of the first conference room being located behind the aperture, wherein the aperture is located so as to coincide with a visually insignificant area of the image of the second conference room as displayed on the first large format display system, and wherein the visually insignificant area corresponds to an image of an unobtrusive physical object located in the second conference room.

22. The method of video conferencing of claim 21 further comprising projecting the captured image onto a second large format display system in the second conference room at or near life size.

23. The method of video conferencing of claim 21 further comprising:
   receiving in the first conference room sound from the second conference room;
   projecting the received sound into the first conference room;
   capturing sound in the first conference room; and
   transmitting the captured sound to the second conference room for projection in the second conference room.

24. The method of video conferencing of claim 21 further comprising:
   capturing a high fidelity resolution image of an item at a pre-determined location within the second conference room;
   transmitting the captured high fidelity resolution image to the first conference room;
   receiving in the first conference room the captured high fidelity resolution image; and
   projecting in the first conference room the captured high fidelity resolution image for viewing.

25. A method of video conferencing between a first conference room and a second conference room, comprising:
- receiving in the first conference room an image of the second conference room;
- projecting the image onto a first large format display system in the first conference room at or near life size;
- capturing an image of the first conference room and a participant in the first conference room using a camera located at a position within the first conference room that is substantially medial to the first large format display system and at or about eye level of a participant, the camera substantially hidden from the view of the participant in the conference room; and
- transmitting the captured image to the second conference room for viewing;
- wherein at least one of the rooms contains:
  - a plurality of overhead indirect lighting fixtures which do not direct light towards the display system and create a shadow zone in front of the display system, thereby increasing image contrast of the display system;
  - a plurality of side indirect lighting fixtures;
  - a table; and
  - a light source underneath the table.

26. The method of video conferencing of claim 25, further comprising providing a table in at least one of the rooms and a light source underneath the table which includes lighting along underside edges of the table.

27. A method of making a video conference system between two rooms, the method comprising:
- placing a large format display system in each room;
- placing a first camera in each room in a position within the room that is substantially medial to the large format display system and at or about eye level of a participant in the room, the camera substantially hidden from the view of the participant in the room; and
- electronically coupling the two rooms together to bidirectionally communicate audio and video information;
- wherein each large format display system defines an aperture, the first camera in each room being located behind the aperture, wherein the aperture is located so as to coincide with a visually insignificant area of the image of the other room as displayed on the large format display system, and
- wherein the usually insignificant area corresponds to an image of an unobtrusive physical object located in the other conference room.

28. The method of claim 27, further comprising:
furnishing the rooms with substantially similar furnishings, the furnishings arranged in a substantially similar manner, including similar furniture, lights, wall color and wall surfaces.

29. A method of making a video conference system between two rooms, the method comprising:
- placing a large format display system in each room, the large format display system having a projection screen disposed along or into a wall of the room;
- placing a camera in a position within each room so that a participant in the room has a line of sight to a medial portion of the large format display system, the line of sight being within the field of view of the first camera in the room, the camera substantially hidden from the view of the participant in the room;
- electronically coupling the two rooms together to bidirectionally communicate audio and video information; and
- placing in each room:
  - a plurality of overhead indirect lighting fixtures which do not direct light towards the display system and create a shadow zone in front of the display system, thereby increasing image contrast of the display system.

30. The method of claim 29, further comprising:
furnishing the rooms with substantially similar furnishings, the furnishings arranged in a substantially similar manner, including similar furniture, lights, wall color and wall surfaces.

31. The method of claim 29 further comprising placing in each room a table and a light source underneath the table which includes lighting along underside edges of the table.

32. A video conference system, comprising:
- a first conference room and a second conference room, the conference rooms electronically coupled together to permit transmission of images from each room to the other room for viewing, each conference room having:
  - a large format display system for projecting images; and
  - a camera positioned with respect to the large format display system to capture an image of the conference room and a participant in the room, without substantially obscuring the participant's view of the large format display system, so as to provide the perception that the participant in the room is looking directly at a participant in the other conference room,
- further comprising in each conference room:
- a plurality of overhead indirect lighting fixtures which do not direct light towards the display system and create a shadow zone in front of the display system, thereby increasing image contrast of the display system.

* * * * *